Patented Oct. 17, 1950

2,526,008

UNITED STATES PATENT OFFICE 2,526,008

PREPARATION OF TRICHLORO ETHER ESTERS

Willard J. Croxall, Bryn Athyn, and Marian F. Fegley, Mont Clare, Pa., assignors to Rohm & Haas Company, Philadelphia, Pa., a corporation of Delaware No Drawing. Application August 19, 1949, Serial No. 111,332

8 Claims. (Cl. 260—484)

This invention relates to compounds of the formula

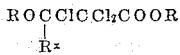

wherein $R^x$ is hydrogen, or the —COOR group, and R is an alkyl group, particularly a non-tertiary alkyl group of not over four carbon atoms. These compounds are useful chemical intermediates. This invention further deals with a method for the preparation of these compounds.

The method of preparation of the above compounds comprises chlorinating a compound of the formula

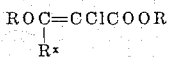

where $R^x$ and R have the same significance as above. Chlorine gas is run into such a compound or a solution thereof in an inert organic solvent at a temperature between about —5° C. and 20° C. until about a mole of chlorine has been added per mole of said compound. As typical of useful inert solvents, there may be mentioned carbon tetrachloride, ethylene dichlorine, and trichloroethane. Excess chlorine and solvent are removed, as by distillation, and the desired trichloro compound separated.

The alkyl α-chloro-β-alkoyacrylates and dialkyl α-chloro-β-alkoxymaleates, which serve as starting materials for the process of this invention, are available through the reaction described in our application Serial No. 111,331, filed on even date. As there described, an alkyl β-alkoxyacrylate or dialkyl alkoxymaleate is reacted with chlorine at about —5° C. to 20° C., desirably in an inert organic solvent. The reaction mixture is then heated at 150°–250° C., preferably 150°–170° C. Hydrogen chloride is split out. It may be taken off or absorbed. The monochloro compounds are desirably purified by distillation at low pressure.

The alkyl β-alkoxyacrylates and dialkyl alkoxymaleates are available through the reaction of acetylene and dialkyl carbonates in the presence of an anhydrous strongly basic catalyst. Full details of preparation of these alkoxy esters are given in application Serial No. 52,607, filed by Croxall and Schneider on October 2, 1948. By this reaction, there are formed β-ether acrylates, β,β-diether propionates, ether maleates, and diether succinates.

The diether propionates are readily converted to β-ether acrylates and the diether succinates to ether maleates when the diether compounds are heated in the presence of a dealcoholating catalyst, such as an alkali metal acid sulfate, and a mole of alcohol taken off per mole of starting ester. This process is described in full in application Serial No. 52,608, filed by Croxall and Schneider on October 2, 1948.

In the preparation of the alkoxy esters, there may thus be taken a carbonate ester, $(RO)_2CO$, in which R is a non-tertiary alkyl group, preferably of not over four carbon atoms for purposes of the present invention. Acetylene is reacted therewith at 20° C. to 110° C. in the presence of a strongly alkaline catalyst, such as an alkali metal acetylide, an alkali metal alcoholate, or a strongly basic quaternary ammonium alkoxide. When acetylene is no longer taken up by the reaction mixture, the catalyst is destroyed as with acid, and the reaction mixture is separated, usually by distillation. A fraction containing both ether acrylates and propionates is readily obtained. There are also obtained in mixture or separately ether maleates and succinates.

While acrylate may be separated from propionate or maleate from succinate, the respective mixtures may be heated at 150° C. to 250° C. in the presence of an alkali metal acid sulfate, a strong acid, or an alkaline catalyst and alcohol split from the diether propionate or diether succinate to give the corresponding acrylate or maleate.

Typical of the carbonate esters which lead to the ether esters utilized in the present invention are dimethyl carbonate, diethyl carbonate, dipropyl carbonate, diisopropyl carbonate, dibutyl carbonate, diisobutyl carbonate, and di-sec.-butyl carbonate. Esters of carbonic acid and higher non-tertiary alcohols undergo the same reaction with acetylene, but are not ordinarily of interest for present purposes. Typical catalysts for effecting the reaction with acetylene are sodium acetylide, potassium acetylide, sodium methylate, sodium ethylate, potassium butoxide, benzyl trimethyl ammonium ethoxide, dibenzyl dimethyl ammonium tert.-butoxide, etc. The catalyst is used in an amount from 0.01% to 5% of the weight of the carbonate ester.

To illustrate the reaction of dialkyl carbonate and acetylene there is given the following example of the preparation of ether esters. The apparatus used comprised a five-liter flask and a gas-tight, stainless-steel stirrer. Therein was placed 225 grams of anhydrous ethyl alcohol and small cubes of sodium were gradually added to a total of 30 grams. The sodium was dissolved and excess alcohol removed under reduced pressure. To the flask containing sodium ethylate there was added 2200 grams of diethyl carbonate. The flask was then equipped with gas inlet and outlet tubes, manometer, and thermometer. It was flushed with nitrogen and heated to 80° C. Acetylene was passed in. When the rate of absorption became very slow, the flask was cooled and the flow of acetylene discontinued. Dilute acetic acid was added to destroy the catalyst. Two layers were formed. The upper, oily layer was separated and fractionally distilled.

A forerun taken at atmospheric pressure consisted of ethyl alcohol and ethyl carbonate. Distillation was continued under reduced pressure. A fraction distilled at 65°–75° C./2–4 mm. consisted of about 10% of ethyl β-ethoxyacrylate and 90% of ethyl β,β-diethoxypropionate. At 75° C./4 mm., a fraction of pure ethyl β,β-diethoxyproprionate was obtained. Between 75° C./4 mm. and 114° C./3 mm., a mixture of ethyl β,β-diethoxypropionate and diethyl α,α-diethoxysuccinate was taken off. At 114°–115° C./3–4 mm., there was obtained a fraction consisting of diethyl α,α-diethoxysuccinate. On further distillation, a fraction containing this ether succinate and diethyl α-ethoxymaleate was obtained.

In the same way other esters of carbonic acid and monohydric alcohols may be reacted with acetylene to give ether propionates, acrylates, succinates, and maleates. Other alkaline catalysts may be used in the place of sodium ethylate.

Typical ether esters which are thus available include methyl β-methoxyacrylate, methyl β,β-dimethoxypropionate, ethyl β-ethoxyacrylate, ethyl β,β-diethoxypropionate, propyl β-propoxyacrylate, propyl β,β-dipropoxypropionate, butyl β-butoxyacrylate, butyl β,β-dibutoxypropionate, dimethyl α,α-dimethoxysuccinate, diethyl α,α-diethoxysuccinate, dibutyl α,α-dibutoxysuccinate, dimethyl α-methoxymaleate, diethyl α-ethoxymaleate, and dibutyl α-butoxymaleate. Other ether esters are similarly available, but the above are examples of the preferred esters readily available through reaction of carbonate and acetylene.

The diether propionates and succinates are readily converted to comparable ether acrylates and maleates, as indicated above, by heating them or mixtures containing them with a dealcoholating catalyst between 80° and 250° C. The catalyst may be an anhydrous strongly alkaline agent or an acidic catalyst. There is split out a molecule of alcohol for each molecule of the starting diether ester. This is taken off at normal or reduced pressure. The catalyst may then be removed, as by washing, and the unsaturated ester recovered.

Optimum temperatures for converting diether succinates to ether maleates vary somewhat with different catalysts. Typical optimum temperatures for specific catalysts are 200°–220° C. for zinc chloride, 180°–200° C. for sulfuric acid, 180°–200° C. for sodium acid sulfate, 160°–180° C. for p-toluene sulfonic acid, and 130°–165° C. for sodium ethylate.

Some typical conversions of diether propionates to ether acrylates and diether succinates to ether maleates follow.

*Example A–1*

There were charged to a reaction vessel equipped with a short packed column 192 grams of ethyl β,β-diethoxypropionate and one gram of sodium acid sulfate. The mixture was heated slowly. At about 80° C., there began to be evolved vapors which, when condensed, proved to be those of ethyl alcohol. The heating was continued and the temperature of the batch steadily increased. At 114° to 150° C., there was a good evolution of vapor about the particles of catalyst. There was taken off through the column a distillate boiling at 78.5° to 80° C., amounting to 44.5 grams of ethyl alcohol. With the batch temperature finally carried to about 160° C., there was taken off an intermediate fraction of fifteen grams with an overhead temperature between 80° and 90° C. The pressure was then reduced and the main fraction taken off at overhead temperatures of 85.5°–86.5° C. at 19 mm. There remained a residue of thirteen grams.

The main fraction had a refractive index, $n_D^{20}$, of 1.447 and corresponded in composition to ethyl β-ethoxyacrylate.

*Example A–2*

In accordance with the method of Example A–1, there were heated ninety-six grams of n-butyl β,β-di-(n-butoxy)propionate and 0.25 gram of sodium acid sulfate. Between 110° and 160° C. (batch temperature), there was evolved n-butanol, which was taken off at overhead temperatures of 110°–114° C. With the temperature of the reaction mixture finally advancing to about 180° C., there was then taken off a main fraction, boiling at 110°–111° C./3 mm. There remained twelve grams of residue. The main fraction contained by analysis 66.12% of carbon and 9.64% of hydrogen, corresponding to butyl β-butoxyacrylate. The theoretical analytical values of this compound are 66.00% for carbon and 10.00% for hydrogen. The product had a saponification number of 288, compared to the theoretical value of 290.

*Example A–3*

In a flask equipped with a short column, there were placed 0.25 gram of sodium and twenty milliliters of ethanol. The sodium was reacted with the alcohol and excess ethanol removed by heating under reduced pressure to give a white, powdery sodium ethylate. Thereto was added fifty grams of ethyl β,β-diethoxypropionate, and the reaction mixture was heated at atmospheric pressure at first and then at reduced pressure. At batch temperatures of 90° to 150° C., the charged ester was decomposed. There were obtained ten grams of ethanol (boiling at 78.5° C.), an intermediate fraction, distilling at overhead temperatures of 78.5° C. to 51.5° C./1.5 mm., and twenty-four grams of ethyl β-ethoxyacrylate, distilling at 51° C./1.5 mm. overhead temperature.

*Example A–4*

The procedure of Example A–1 was applied to a charge of 954 grams of methyl β,β-dimethoxypropionate and 0.1 gram of sodium acid sulfate. There were obtained 185 grams of methanol and 650 grams of methyl β-methoxyacrylate, boiling at 60° C./12 mm. and having a refractive index, $n_D^{19}$, of 1.4501.

*Example A–5*

The general procedures of the previous examples were applied to a reaction mixture of 292 grams of diethyl α,α-diethoxysuccinate and 0.5 gram of sodium acid sulfate. At batch temperatures of about 200° C., there were obtained ethanol in the amount of forty-six grams and 143 grams of diethyl α-ethoxymaleate, distilling with an overhead temperature of 97°–98° C./0.5 mm. and having a refractive index of 1.4562. Analysis of the distillate gave the following values: Carbon, 55.83% and hydrogen, 7.65%, compared to theoretical values of 55.55% and 7.39%, respectively.

*Example A–6*

In a five hundred milliliter flask carrying a twelve-inch column packed with glass helices and a sidearm through which a capillary tube was inserted there were placed 206 grams of dimethyl α,α-dimethoxysuccinate and two drops of 95% sulfuric acid. A slow stream of nitrogen was passed into the flask through the capillary tube, and the flask and contents were heated to about 190° C. Methanol was slowly distilled out of the flask. The temperature of the batch was then increased gradually to 200° C. The pressure thereover was reduced. A distillate was taken off up to 120° C./15 mm. and was found to consist of methanol, unchanged dimethyl α,α-dimethoxysuccinate and dimethyl methoxymaleate. There was obtained at 120° to 130° C./15–16 mm. a fraction of pure dimethyl methoxymaleate amounting to ninety-six grams. When this fraction was left standing it formed crystals which melted at 40° C.

By methods such as have just been described, there are obtained alkyl β-alkoxyacrylates and dialkyl α-alkoxymaleates which are reacted with chlorine to give α,β-dichloro compounds, which are in turn split by heating to give the α-chloro unsaturated esters, which are in turn reacted with chlorine to give the new α,α,β-trichloro compounds of the present invention.

To illustrate the preparation of typical α-chloro unsaturated esters, the following examples are given.

*Example B–1*

There were mixed in a reaction vessel equipped with stirrer, reflux condenser, and gas inlet tube 216 parts by weight of ethyl β-ethoxyacrylate and 200 parts of chloroform. This mixture was cooled by use of a salted ice bath. Chlorine gas was bubbled through the mixture while it was kept below 10° C. When an excess of chlorine had been added, as shown by development of a yellow color, the passage of chlorine was discontinued. Excess chlorine and part of the chloroform were removed under reduced pressure while the reaction mixture was gently warmed. The product was ethyl α,β-dichloro-β-ethoxypropionate in chloroform solution.

A mixture of 178.5 parts of ethyl β-ethoxyacrylate and 250 parts of chloroform was reacted with chlorine as above. Excess chlorine and chloroform were taken off by heating. Hydrogen chloride was evolved and the material in the reaction vessel was heated to 150–160° C. for two hours. It was then fractionally distilled. A forerun of a small amount of ethyl β-ethoxyacrylate was obtained at 95°–150° C./61 mm. At 150°–155° C./61 mm., there was distilled ethyl α-chloro-β-ethoxyacrylate. It has a refractive index, $n_D^{20}$, of 1.4728. By analysis the product obtained contained 20.11% of chlorine. The theoretical chlorine content for ethyl-α-chloro-β-ethoxyacrylate is 19.85%. The yield was 92%.

*Example B–2*

Ethyl αβ-dichloro-β-ethoxypropionate was prepared as in Example B–1 above. It was run very slowly into a mixture of 1.35 gram moles of triethylamine in 400 ml. of ethyl ether until 1.28 gram moles of the ether ester had been added. Triethylamine hydrochloride was formed and was separated by filtration. The ether was distilled off and the resulting material filtered to remove additional triethylamine hydrochloride which had separated. It was then distilled at 78°–80° C./1 mm. to give a 78% yield of ethyl α-chloro-β-ethoxyacrylate.

*Example B–3*

A solution of 116 parts by weight of methyl β-methoxyacrylate in 250 parts of chloroform was cooled to 10° C. and treated with chlorine gas as in Example B–1. The temperature of the reaction mixture was kept between 2° and 10° C. by use of an ice-salt bath. As soon as a yellow color developed, excess chlorine was taken off along with most of the chloroform by stripping under reduced pressure. The product thus obtained was methyl α,β-dichloro-β-methoxypropionate.

A portion of this product was heated at 170° C. for 1.5 hours. Hydrogen chloride was taken off as it was evolved. The heated product was then fractionally distilled. A forerun of methyl β-methoxyacrylate was taken off at 95°–124° C./28 mm. At 124°–128° C./28 mm., a fraction was distilled which corresponded in composition to that of methyl α-chloro-β-methoxyacrylate. The redistilled product boiled at 124°–125° C./28 mm. and had a refractive index, $n_D^{20}$, of 1.4838.

*Example B–4*

(a) A mixture of 31.5 parts of butyl β-butoxyacrylate in 75 parts of chloroform was cooled to 5° C. and chlorine passed therethrough while the temperature was kept between 0° and 8° C. by means of an ice-salt bath. The chloroform was distilled from the reaction mixture and the resulting material heated at 160°–180° C. for an hour. It was then distilled at low pressure. After a forerun of butyl β-butoxyacrylate, there was obtained a fraction of 18 parts which distilled at 135°–146° C./4 mm. and corresponded in composition to butyl α-chloro-β-butoxyacrylate.

(b) A mixture of 89 parts of ethyl α-chloro-β-ethoxyacrylate, 112 parts of normal butyl alcohol, and 2 parts of p-toluene sulfonic acid was heated in a reaction vessel equipped with a packed distilling column topped with partial take-off head. Ethanol was distilled from the reaction mixture. When it was no longer obtained, the temperature was raised and butanol was taken off. The mixture was then subjected to fractional distillation at reduced pressure. A forerun of eight parts distilling at 90°–122° C./4 mm. consisted of mixed ethyl α-chloro-β-ethoxyacrylate and butyl α-chloro-β-butoxyacrylate. At 122°–145° C./4 mm., there was obtained butyl α-chloro-β-butoxyacrylate in an amount of 65 parts. This material was redistilled at 142°–144° C./4 mm. to give a very pure product, which had a refractive index of 1.4674 and which contained by analysis 14.75% of chlorine (theory 14.76%).

The above example shows how the ether acrylates can be transetherified and transesterified as a means of passing from a lower ester to a higher. It should also be mentioned that by use of a mild dealcoholating catalyst, such as sodium acid sulfate, a smaller ether group may be replaced with a larger one without changing the ester group. Thus, ethyl β-ethoxyacrylate is heated with butyl alcohol to yield ethyl β-butoxyacrylate or with octyl alcohol to yield ethyl β-octoxyacrylate. As shown above, the α-chloro-β-alkoxyacrylates similarly undergo ether and ester interchange. The same reactions can be effected with the β-chloro-α-alkoxymaleates.

*Example B-5*

(a) A reaction vessel equipped with stirrer, condenser, and gas inlet tube was charged with 108 parts of diethyl α-ethoxymaleate and 200 parts of chloroform. The solution was cooled to 10° C. and chlorine was bubbled through the solution. The temperature of the reaction mixture was held below 12° C. by external cooling. When excess chlorine has been added, the chloroform was distilled along with free chlorine by gentle warming under reduced pressure. The product remaining was diethyl α,β-dichloro-β-ethoxysuccinate.

(b) The above preparation was repeated, but the chloroform was distilled off at atmospheric pressure and the material remaining was heated slowly until an upper limit of 220° C. was reached. Hydrogen chloride was evolved and was taken off. The material was then subjected to fractional distillation at low pressure. At 90°–112° C./3 mm., unreacted diethyl ethoxymaleate was recovered. At 113° C.–129° C./3 mm., there was obtained diethyl α-chloro-β-ethoxymaleate in an amount of 116 parts. A residue of 8 parts remained. The product was redistilled at 118°–121° C./3 mm. It then had a refractive index, $n_D^{20}$, of 1.4670, a molecular refraction, $MR_D$, of 58.335 (theory 57.731), and a density, $d_4^{20}$ of 1.1924.

In the same way dibutyl α-butoxymaleate was chlorinated, the intermediate heated, and the resulting materials distilled. The fraction distilling at 130°–138° C./2 mm. corresponds in composition to dibutyl α-chloro-β-butoxymaleate. This product has plasticizing action on polyvinyl chloride.

The reaction of alkyl α-chloro-β-alkoxyacrylates with chlorine is illustrated by the following examples.

*Example C-1*

A solution of 50 parts by weight of methyl α-chloro-β-methoxyacrylate in 200 parts of chloroform was placed in a three-necked flask equipped with stirrer, reflux condenser, and gas inlet tube. The solution was stirred and cooled by means of an external ice-salt bath to about 5° C. Chlorine was bubbled into the solution while the temperature was maintained between 0° and 10° C. An tion mixture began to develop a yellow color. The excess chlorine and the chloroform were stripped off and the reaction mixture was fractionally distilled. At 64° to 67° C./2 mm., there was obtained a fraction which corresponded in composition to methyl α,α,β-trichloro-β-methoxypropionate in a yield of 83%. On redistillation this product had a refractive index, $n_D^{20}$, of 1.4701.

*Example C-2*

A solution of 100 parts by weight of ethyl α-chloro-β-ethoxyacrylate in 250 parts by weight of chloroform was reacted with chlorine by the steps described in Example C-1. At 90°–97° C./1 mm., there was collected a fraction which contained the ethyl α,α,β-trichloro-β-ethoxypropionate. This was redistilled at 95°–97° C./1 mm. The redistilled product had a refractive index, $n_D^{20}$, of 1.4618. It contained by analysis 42.48% of chlorine. The theory for $C_7H_{11}O_3Cl_3$ is 42.7%. The yield was 93%.

*Example C-3*

In the same way butyl α-chloro-β-butoxyacrylate was chlorinated. The fraction collected at 130°–139° C./1 mm., corresponded in composition to butyl α,α,β-trichloro-β-butoxypropionate. The product as obtained contained 35.5% of chlorine.

*Example C-4*

A solution of 70 parts by weight of diethyl α-chloro-β-ethoxymaleate in 250 parts of chloroform was cooled to about 0° C. While it was stirred, chlorine was bubbled into it and its temperature was held below 10° C. When an excess of chlorine had been run in, the reaction mixture was heated under reduced pressure. Excess chlorine and chloroform were taken off followed by a small forerun which distilled at 110°–129° C./2.5 mm. Between 129° and 132° C./2.5 mm., there was obtained a fraction which amounted to 80 parts by weight and corresponded in composition to diethyl α,α,β-trichloro-β-ethoxysuccinate. A redistilled portion had a refractive index, $n_D^{20}$, of 1.4637, a molecular refraction of 68.956, and a density of 1.286.

*Example C-5*

Dimethyl α-chloro-β-methoxymaleate was reacted with chlorine in the same way as the diethyl ester in the previous example. The product obtained was dimethyl α,α,β-trichloro-β-methoxysuccinate in a fraction distilling at 105°–115° C./2–3 mm.

Dibutyl α,α,β-trichloro-β-butoxysuccinate is obtained by the same procedure, starting with dibutyl α-chloro-β-butoxymaleate and chlorine. After excess chlorine and solvent is removed, the desired ester is obtained in a fraction distilling at 160°–175° C/2–3 mm.

The dialkyl trichloro-β-alkoxysuccinates and alkyl trichloro-β-alkoxypropionates react with alcohols with displacement of a β-chlorine atom by an alkoxy group. The products thus obtained have the structure

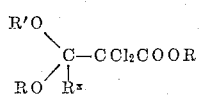

where R' is the residue of the alcohol reacted with the trichloro compound. Hydrogen chloride is displaced on heating together an alcohol with a trichloro alkoxyacrylate or succinate. Reflux temperatures are sufficient to drive off hydrogen chloride, which may, on the other hand, be split out even at room temperature by use of a reagent to absorb or react with it. Tertiary amines, calcium carbonate, sodium bicarbonate, and the like may be used for this purpose. A typical reaction of a trichloro compound and an alcohol follows.

A solution of 90 parts of ethyl α,α,β-trichloro-β-ethoxypropionate in 400 parts of anhydrous ethanol was treated with several drops of hydrochloric acid and heated on a steam bath for eight hours. Ethanol was distilled off at 77°–80° C. A forerun was then taken at 20° C./17 mm. to 85° C./2 mm. There was then obtained a fraction of 130 parts of ethyl α,α-dichloro-β,β-diethoxypropionate at 85°–92° C./2 mm. It had a refractive index, $n_D^{20}$, of 1.4488 and a density, $d_4^{20}$, of 1.189. It contained 27.59% of chlorine (theory is 27.6%).

In place of ethyl alcohol, as used above, there may be used other alcohols and even phenols. Thus, methyl, propyl, butyl, amyl, octyl, dodecyl, allyl, benzyl, cyclohexyl, or other alcohol may be used or phenol, alkylphenols, chlorophenols, alkoxyphenols, or the like.

As typical of the reactions with phenols, there may be recited the following reaction. Eighty parts by weight of ethyl $\alpha,\alpha,\beta$-trichloro-$\beta$-ethoxypropionate and 50 parts of tert.-butylphenol were mixed and heated to about 60° C. under reduced pressure. Hydrogen chloride was evolved. The temperature was then slowly raised and unreacted starting materials were taken off. Between 150° and 165° C./2-3 mm., a fraction was obtained which corresponded in composition to that of ethyl $\alpha,\alpha$-dichloro-$\beta$-ethoxy-$\beta$-butylphenoxypropionate.

Another reaction for which the products of this invention serve as starting materials is one with non-tertiary amines, particularly primary amines. The reaction of butylamine and ethyl $\alpha,\alpha,\beta$-trichloro-$\beta$-ethoxypropionate is typical of these. A mixture of 30 parts of this amine and 50 parts of the above ester was stirred. As the heat of reaction caused a rapid rise of temperature, external cooling was applied to hold the temperature below 85° C. When the initial vigor of the reaction subsided, the mixture was heated for several hours under reflux and then cooled. Butylamine hydrochloride separated. Methanol was added to maintain fluidity. Ammonia gas was bubbled into the reaction mixture and ammonium chloride separated. The amine hydrochloride and the salt were removed by filtration. The mixture was subjected to distillation. After removal of methanol, ethanol, and butylamine, there was obtained an intermediate fraction followed by a fraction taken at 120°–130° C./3 mm. which contained the product, $$C_4H_9N=CHCCl_2COOC_2H_5$$

We claim:

1. A process for preparing compounds of the formula

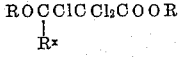

which comprises chlorinating an unsaturated compound of the formula

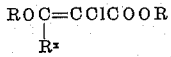

between −5° C. and 20° C. until about one mole of chlorine has been taken up per mole of said unsaturated compound, R representing a non-tertiary alkyl group of not over four carbon atoms and $R^x$ representing a member of the class consisting of hydrogen and the —COOR group.

2. A process for preparing methyl $\alpha,\alpha,\beta$-trichloro-$\beta$-methoxypropionate which comprises chlorinating methyl $\alpha$-chloro-$\beta$-methoxyacrylate between −5° C. and 20° C. until about one mole of chlorine has been taken up per mole of said unsaturated compound.

3. A process for preparing ethyl $\alpha,\alpha,\beta$-trichloro-$\beta$-ethoxypropionate which comprises chlorinating ethyl $\alpha$-chloro-$\beta$-ethoxyacrylate between −5° C. and 20° C. until about one mole of chlorine has been taken up per mole of said unsaturated compound.

4. A process for preparing diethyl $\alpha,\alpha,\beta$-trichloro-$\beta$-ethoxysuccinate which comprises chlorinating diethyl $\alpha$-chloro-$\beta$-ethoxymaleate between −5° C. and 20° C. until about one mole of chlorine has been taken up per mole of said unsaturated compound.

5. New chemical compounds of the formula

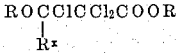

wherein R is a non-tertiary alkyl group of not over four carbon atoms and $R^x$ is a member of the class consisting of hydrogen and the —COOR group.

6. As a new chemical compound, methyl $\alpha,\alpha,\beta$-trichloro-$\beta$-methoxypropionate.

7. As a new chemical compound, ethyl $\alpha,\alpha,\beta$-trichloro-$\beta$-ethoxypropionate.

8. As a new chemical compound, diethyl $\alpha,\alpha,\beta$-trichloro-$\beta$-ethoxysuccinate.

WILLARD J. CROXALL.
MARIAN F. FEGLEY.

No references cited.